Figure 1:
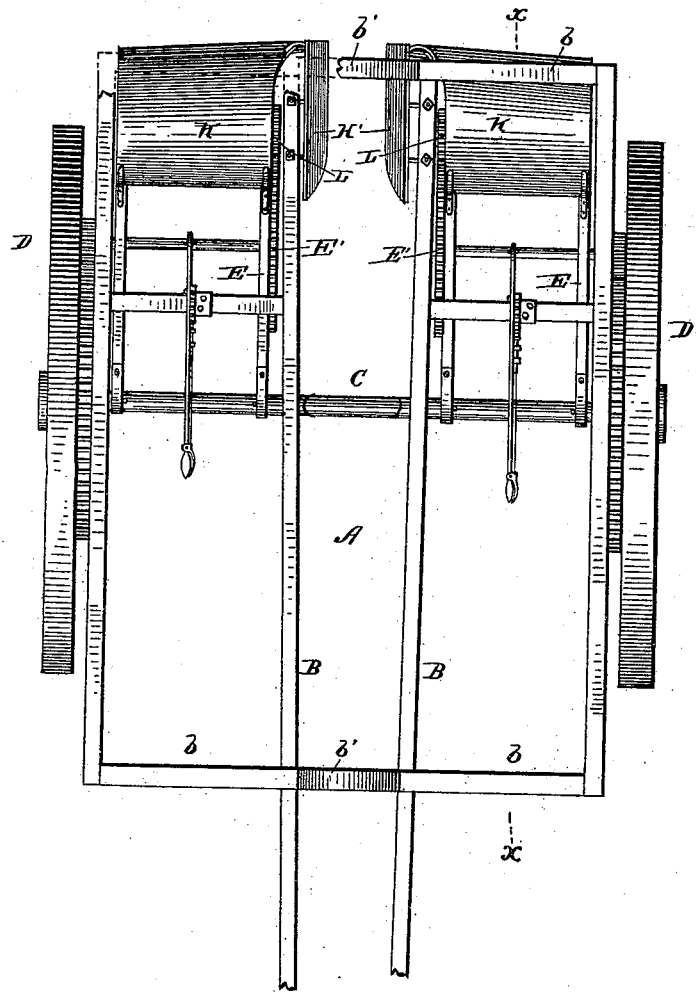

(No Model.)
2 Sheets—Sheet 1.

L. C. ERWIN.
CULTIVATOR AND PULVERIZER.

No. 361,866. Patented Apr. 26, 1887.

Witnesses
John S. Finch Jr.
Chas. L. Davis

Inventor
L. Clayton Erwin
By his Attorney
C. M. Alexander (No Model.) 2 Sheets—Sheet 2.
L. C. ERWIN.
CULTIVATOR AND PULVERIZER.
No. 361,866. Patented Apr. 26, 1887.
Fig. 2.
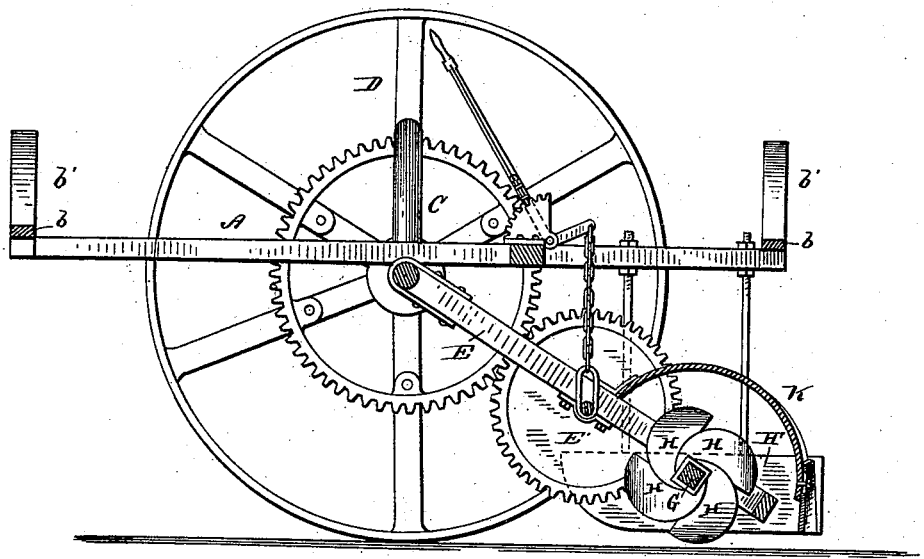
Fig. 3.
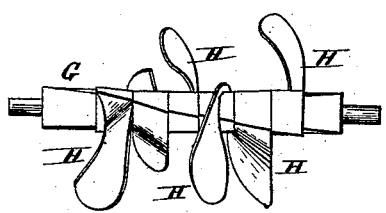
Fig. 5.
Fig. 4.
Witnesses
John S. Finch Jr.
Chas D. Davis
Inventor
L. Clayton Erwin
By his Attorney
C. M. Alexander

UNITED STATES PATENT OFFICE.

LEWIS CLAYTON ERWIN, OF YORK, PENNSYLVANIA.

CULTIVATOR AND PULVERIZER.

SPECIFICATION forming part of Letters Patent No. 361,866, dated April 26, 1887.

Application filed February 17, 1887. Serial No. 227,930. (No model.)

*To all whom it may concern:*

Be it known that I, LEWIS CLAYTON ERWIN, a citizen of the United States, residing at York, in the county of York and State of Pennsylvania, have invented certain new and useful Improvements in Cultivators and Pulverizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in cultivators; and it has for its objects to provide for working the ground at each side of a row of growing plants, and moving the loosened earth toward the row in such manner as to hill the plants without injuring the same, as more fully hereinafter specified.

The above-mentioned objects I attain by the means illustrated in the accompanying drawings, in which—

Figure 1 is a top view of my improved cultivator; Fig. 2, a longitudinal vertical section thereof; Fig. 3, a detached view showing the rotary shovels or plows mounted upon their shafts. Fig. 4 represents a detached perspective view of the plow-shaft, and Fig. 5 a perspective view of one of the shovels or plowshares detached.

Referring to the drawings, the letter A indicates the frame or truck of the cultivator, the front and rear bars, *b*, of which are arched, as indicated by the letter *b'*, so as to straddle and pass over the growing plants.

B indicates the shafts, which extend back to the rear of the frame, the said extended portions leaving an open space from the front to back of the machine, for the purpose hereinafter explained.

The letter C indicates the axle of the machine, which is arched at the center, as shown, so as to pass over the growing plants.

The frame is mounted upon wheels D, at each side, journaled upon the ends of the axle, and each is provided with a cogged gear-wheel intermeshing with a wheel, E', journaled in a frame, E, hinged to the axle at each side of the machine.

Each frame, near its lower end, has journaled in suitable bearings a twisted rectangular shaft, G, forming virtually a screw, upon which are mounted the plowshares in shovel-sections H. These consist of segmental blades having a rectangular head provided with an open socket adapted to fit upon the twisted shaft before mentioned. The blades are so arranged with respect to the heads that when placed upon the shaft they will form a series of screw blades or cutters, which, when rotated, will cut and dig the earth and force it toward the center of the machine from each side, so as to "hill" the row of plants. To protect the upper parts of the plants from the earth thus thrown toward them, the frame A is provided with adjustable shields H', and to insure the delivery of the earth to each side of the row, so as to properly hill the same, the frames are provided with hoods K, which each consists of a half frustum of a cone, with its larger end toward the center of the machine. These hoods extend over the cutters, so as to confine the earth thrown up thereby and direct it toward the row. The shafts G are each provided with a pinion, L, intergearing with the wheel E', by means of which a rotary motion is imparted to the plows or shovels.

The lower rear edges of the hoods K are each provided with adjustable sections K', as clearly shown in Fig. 2, to enable them to be adjusted according to the work to be performed.

Having thus fully described my invention, what I claim, and desire to secure by Letters Patent, is—

1. The combination, with the truck having arched front and rear bars and an arched axle, of the centrally-extended shafts, the driving-wheels and intermeshing gear-wheels, and the rear shafts having a series of spirally-arranged blades or shovels, substantially as and for the purposes specified.

2. The combination, with the rear frames of the machine, of the twisted rectangular shafts, the plowshares or shovels provided with rectangular heads fitting upon the shaft, and the mechanism for operating the shaft, substantially as specified.

3. The combination, with the main frame, of the rear frames having spirally-arranged plowshares or shovels, the mechanism for operating the same, the shields attached to said frames, and the hoods arranged to deliver the earth toward the center of the machine, substantially as specified.

In testimony whereof I affix my signature in presence of two witnesses.

LEWIS CLAYTON ERWIN.

Witnesses:
H. SAMUEL SPANGLER,
ALFRED J. DIETZ.